US010650658B2

(12) United States Patent
Bender et al.

(10) Patent No.: US 10,650,658 B2
(45) Date of Patent: **\*May 12, 2020**

(54) DIRECTIONAL GEO-FENCING BASED ON ENVIRONMENTAL MONITORING

(71) Applicant: International Business Machines Corporation, Armonk, NY (US)

(72) Inventors: Michael Bender, Rye Brook, NY (US); Jeremy R. Fox, Georgetown, TX (US); Gregory J. Boss, Saginaw, MI (US); Rick A. Hamilton, II, Charlottesville, VA (US)

(73) Assignee: International Business Machines Corporation, Armonk, NY (US)

(\*) Notice: Subject to any disclaimer, the term of this patent is extended or adjusted under 35 U.S.C. 154(b) by 0 days.

This patent is subject to a terminal disclaimer.

(21) Appl. No.: 16/261,953

(22) Filed: Jan. 30, 2019

(65) Prior Publication Data

US 2019/0164408 A1    May 30, 2019

Related U.S. Application Data

(63) Continuation of application No. 15/846,633, filed on Dec. 19, 2017, now Pat. No. 10,229,581, which is a
(Continued)

(51) Int. Cl.
*G08B 21/22* (2006.01)
*H04L 29/08* (2006.01)
(Continued)

(52) U.S. Cl.
CPC ......... *G08B 21/22* (2013.01); *G08B 21/0261* (2013.01); *H04L 67/22* (2013.01);
(Continued)

(58) Field of Classification Search
CPC ... G08B 21/22; G08B 21/0261; H04W 4/029; H04W 4/021; H04W 4/022; H04L 67/22
(Continued)

(56) References Cited

U.S. PATENT DOCUMENTS 8,018,329 B2   9/2011   Morgan et al.
9,043,329 B1   5/2015   Patton et al.
(Continued)

FOREIGN PATENT DOCUMENTS

WO    2012000107 A1    1/2012

OTHER PUBLICATIONS

"Human Condition Safety", <http://www.hcsafety.com/>, Last Printed Mar. 9, 2017, 3 pages.
(Continued)

*Primary Examiner* — Kerri L McNally
(74) *Attorney, Agent, or Firm* — Daniel R. Simek

(57) ABSTRACT

As disclosed herein a dynamic geo-fencing method includes receiving a plurality of geo-fence extent factors, a plurality of extents, and a plurality of violation responses for a geo-fence, determining a first geo-fence extent factor of the plurality of geo-fence extent factors, selecting a first extent for the geo-fence corresponding to the first geo-fence extent factor, determining that the geo-fence is violated, and responsive to determining that the geo-fence is violated, performing a violation response, of the plurality of violation responses, corresponding to the first geo-fence extent factor. A corresponding system and computer program product are also disclosed herein.

20 Claims, 4 Drawing Sheets

Related U.S. Application Data continuation of application No. 15/730,766, filed on Oct. 12, 2017, now Pat. No. 10,229,580.

(51) Int. Cl.
  *H04W 4/021* (2018.01)
  *H04W 4/029* (2018.01)
  *G08B 21/02* (2006.01)

(52) U.S. Cl.
  CPC ........... *H04W 4/021* (2013.01); *H04W 4/022* (2013.01); *H04W 4/029* (2018.02)

(58) Field of Classification Search
  USPC .......................................................... 340/541
  See application file for complete search history.

(56) References Cited

U.S. PATENT DOCUMENTS

| | | | |
|---|---|---|---|
| 9,341,487 B2 | 5/2016 | Bonhomme | |
| 9,432,806 B2 | 8/2016 | Zises | |
| 10,229,580 B1* | 3/2019 | Bender | H04W 4/029 |
| 10,229,581 B1* | 3/2019 | Bender | H04W 4/029 |
| 2011/0148634 A1* | 6/2011 | Putz | G08B 21/22 |
| | | | 340/541 |
| 2012/0284769 A1* | 11/2012 | Dixon | H04W 4/021 |
| | | | 726/1 |
| 2014/0164118 A1* | 6/2014 | Polachi | G06Q 30/0259 |
| | | | 705/14.57 |
| 2014/0242947 A1* | 8/2014 | Ali | H04W 4/022 |
| | | | 455/411 |
| 2014/0357295 A1 | 12/2014 | Skomra et al. | |
| 2016/0295363 A1* | 10/2016 | Jelle | H04W 4/021 |
| 2017/0146970 A1* | 5/2017 | Joo | G05B 19/042 |

OTHER PUBLICATIONS

"North Star BlueScope Steel Taps IBM Watson and Wearable Devices to Monitor Activity of Workers in Extreme Environments", Safety Online, Jun. 23, 2016, © 2016 PR Newswire, <https://www.safetyonline.com/doc/north-star-bluescope-steel-taps-ibm-watson-workers-extreme-environments-0001>, 3 pages.

Bender et al., "Directional Geo-Fencing Based on Environmental Monitoring", U.S. Appl. No. 15/730,766, filed Oct. 12, 2017, 29 pages.

IBM Appendix P, list of patents and patent applications treated as related, filed herewith, 2 pages.

Bender et al., "Directional Geo-Fencing Based on Environmental Monitoring", U.S. Appl. No. 15/846,633, filed Dec. 19, 2017, 29 pages.

* cited by examiner

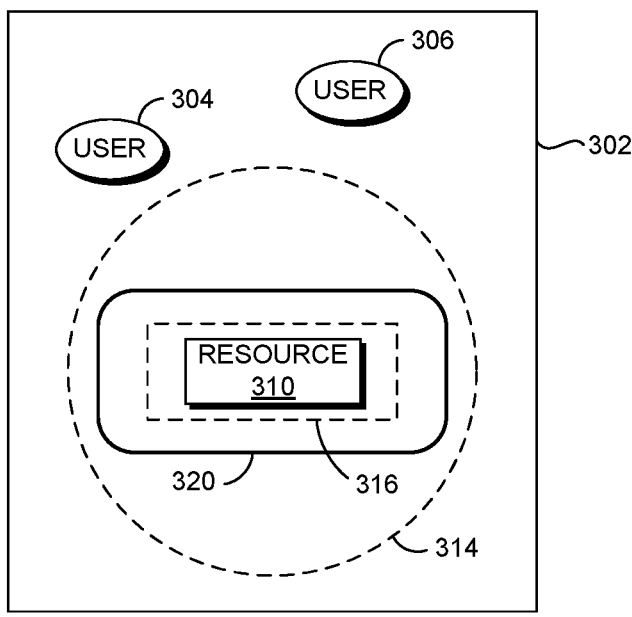
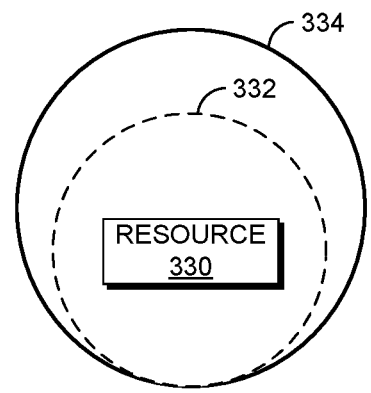
FIG. 3A
FIG. 3B
FIG. 3

DIRECTIONAL GEO-FENCING BASED ON ENVIRONMENTAL MONITORING

BACKGROUND OF THE INVENTION

The present invention relates generally to the field of data processing and more particularly to geo-fencing.

A geo-fence is a virtual perimeter for a real-world geographic area. The geographical boundary of a geo-fence may be defined using a global positioning system or radio frequency identification. One example of usage involves determining when a user of a trackable device is entering or exiting a geo-fence. Such an event could trigger an alert to the device user or a message to the geo-fence operator. Information regarding the location of the trackable device may be sent to a computing device.

SUMMARY

One embodiment of the present invention includes receiving a plurality of geo-fence extent factors, a plurality of extents, and a plurality of violation responses associated with a geo-fence, determining a first geo-fence extent factor of the plurality of geo-fence extent factors, selecting a first extent for the geo-fence corresponding to the first geo-fence extent factor, determining that the geo-fence is violated, and responsive to determining that the geo-fence is violated, performing a violation response, of the plurality of violation responses, corresponding to the first geo-fence extent factor.

BRIEF DESCRIPTION OF THE DRAWINGS

FIGS. 3A and 3B are plan view illustrations depicting examples of dynamic geo-fencing scenarios in accordance with one or more embodiments disclosed herein.

DETAILED DESCRIPTION

Embodiments of the invention disclosed herein recognize that current geo-fence technology is limited in an ability to dynamically modify geo-fence boundaries. Embodiments of the invention disclosed herein provide a rule-based technique for configuring a geo-fence boundary in real-time based upon various factors.

The present invention will be described in detail with reference to the Figures. The descriptions of various instances, scenarios, and examples related to the present invention are presented for purposes of illustration and are not intended to be exhaustive or limited to the embodiments disclosed.

Figure 1A:
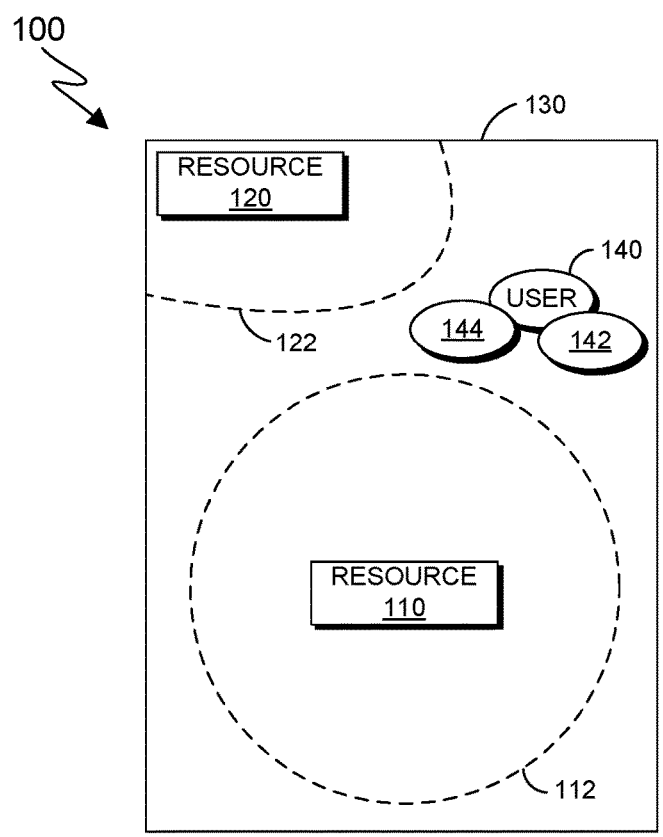
FIG. 1A is a plan view illustration depicting one example of a geo-fencing environment in accordance with one or more embodiments disclosed herein.

FIG. 1A is a plan view illustration depicting one example of geo-fencing environment 100, in accordance with one or more embodiments disclosed herein. FIG. 1A provides only an illustration of one implementation and does not imply any limitations with regard to the environments in which different embodiments may be implemented. Some modifications to the depicted environment may be made by those skilled in the art without departing from the scope of the invention as recited by the claims.

As depicted, geo-fencing environment 100 includes resource 110, geo-fence 112, resource 120, geo-fence 122, activation area 130, and user 140. Geo-fencing environment 100 illustrates the need for dynamic geo-fence configuration.

In some embodiments, a resource (e.g., resource 110) may be any resource associated with geo-fence environment 100 with which an action (e.g., a violation response) can be taken in response to a violation of a corresponding geo-fence. Resource 110 may be, for example, manufacturing machinery, construction equipment, stored inventory, or the like. In some embodiments, resource 120 is substantially similar to resource 110.

In some embodiments, a geo-fence (e.g., geo-fence 112) is a virtual boundary that triggers a violation response when encroached by a user (e.g., user 140). In some embodiments, to determine whether user 140 encroaches geo-fence 112, geo-fence 112 may detect a trackable device (e.g., trackable device 142) worn by user 140. Trackable device 142 may be, for example, a radio frequency identification (RFID) badge or a mobile device worn or carried by a user. Geo-fence 112 may utilize, for example, a global positioning system (GPS), RFID, location-based services, a local positioning system, or an indoor positioning system to detect and track trackable device 142, and thereby determine whether user 140 has encroached the geo-fence. For example, the extent (e.g., geographical boundary) of geo-fence 112 may be determined by location aware devices that utilize radio frequency (RF), such as Bluetooth low energy beacons, magnetic fields, acoustical signals, or optical signals. Such devices may be located at various positions throughout geo-fencing environment 100 and interconnected through the Internet of Things (IoT).

Geo-fences, including the one or more extents for the geo-fence, may be initially defined by a user of geo-fence program 101 and stored in data repository 104. In some embodiments, geo-fence program 101 dynamically determines an extent for the geo-fence in accordance with method 200, as described in FIG. 2. In some embodiments, geo-fence 122 is substantially similar to geo-fence 112. Geo-fence 122 illustrates that the extent of a geo-fence in geo-fencing environment 100 may be defined, at least in part, by the extent of an encompassing activation area.

In some embodiments, an activation area (e.g., activation area 130) is an area that monitors for the presence of a user (e.g., user 140) and tracks the position the user. An activation area may encompass one or more geo-fences. In some embodiments, in response to a user being detected in an activation area, any geo-fences within the activation area are activated to monitor for encroachment by the user. For example, in response to activation area 130 detecting user 140, geo-fence 112 and geo-fence 122 are activated and monitor whether user 140 encroaches either geo-fence.

In some embodiments, to determine the position of user 140, activation area 130 may detect and track a trackable device (e.g., trackable device 142) worn by user 140. Activation area 130 may utilize, for example, a GPS, RFID, location-based services, a local positioning system, or an indoor positioning system to detect and track trackable device 142, and thereby determine the location of user 140 within the activation area. For example, the virtual boundary of activation area 130 may be determined by devices that utilize RF, such as Bluetooth low energy beacons, magnetic fields, acoustical signals, or optical signals. Such devices may be located at various positions throughout geo-fencing environment 100 and interconnected through the IoT to detect and track a user. Activation area 130 may be defined by a user of geo-fence program 101 and stored in data repository 104.

In some embodiments, the extent of a geo-fence is adjusted according to a geo-fence extent factor, e.g., geo-fence extent factor 144. The extent of a geo-fence, adjusted in response to detecting a user within activation area 130, may be determined based on the geo-fence extent factor(s) associated with the detected user. A geo-fence extent factor may be any factor that causes a geo-fence extent to be adjusted to a particular size, shape, or other threshold. A geo-fence extent factor may include, for example, a type of clothing (e.g., flame resistant clothing, protective headwear, eye protection, etc.) worn by a user, a role of a user (e.g., manager, having a certification in various equipment, etc.), a temperature (e.g., atmospheric temperature, body temperature of a user, etc.), and a chemical (e.g., amount or proportion of a chemical in atmosphere, etc.). Geo-fence extent factors may be defined by a user of geo-fence program 101 and stored in data repository 104.

Figure 1B:
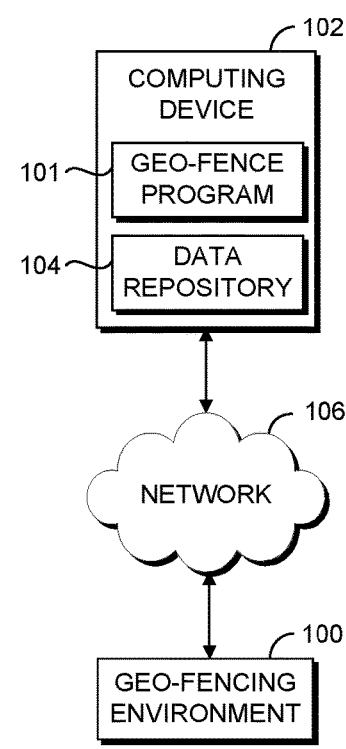
FIG. 1B is a block diagram depicting one example of a distributed data processing environment in accordance with one or more embodiments disclosed herein.

FIG. 1B is a block diagram depicting one example of a distributed data processing environment. FIG. 1B includes computing device 102, geo-fence program 101, data repository 104, network 106, and geo-fencing environment 100. FIG. 1B provides only an illustration of one implementation and does not imply any limitations with regard to the environments in which different embodiments may be implemented. Some modifications to the depicted environment may be made by those skilled in the art without departing from the scope of the invention as recited by the claims.

In some embodiments, computing device 102 and geo-fencing environment 100, including the components of geo-fencing environment 100, are interconnected and communicate through network 106. Network 106 may be any combination of connections and protocols that support communications between computing device 102 and geo-fencing environment 100. Network 106 may be, for example, a local area network (LAN), a wireless local area network (WLAN), such as an intranet, a wide area network (WAN), such as the Internet, a telecommunications network, or any combination thereof. Network 106 may include wired, wireless, or fiber optic connections.

In some embodiments, computing device 102 is any electronic device, or combination of electronic devices, capable of executing computer readable program instructions and communicating with any computing device in geo-fencing environment 100. For example, computing device 102 may be a workstation, personal computer, laptop computer, tablet, personal digital assistant, or mobile phone. In some embodiments, computing device 102 is a computer system utilizing clustered computers and components (e.g., database server computers, application server computers) that act as a single pool of seamless resources when accessed by elements of geo-fencing environment 100. For example, computing device 102 may be a data center in a cloud computing environment. In some embodiments, computing device 102 includes components as depicted and described with respect to computing system 400 in FIG. 4.

In some embodiments, geo-fence program 101 is any computer program, application, subprogram of a larger program, such as an OS, or a combination thereof that performs operations of geo-fencing method 200 (FIG. 2) including receiving geo-fence extent factor information, determining a current geo-fence extent factor, determining a geo-fence for monitoring, determining a violation of the geo-fence, and performing a violation response. In some embodiments, geo-fence program 101 stores and analyzes violation information stored in data repository 104. For example, geo-fence program 101 may determine a pattern of violations with respect to a particular geo-fence based on the information collected and stored in data repository 104. Such information may be continuously collected, updated, and analyzed by geo-fence program 101.

As depicted, geo-fence program 101 is located in computing device 102. In other embodiments, geo-fence program 101 may located in any other computing device connected to geo-fencing environment 100 through network 106.

In some embodiments, data repository 104 contains information related to geo-fences of geo-fencing environment 100. Such geo-fence information may include geo-fence extent factors, extents of geo-fences, corresponding violation responses, and violation information including determined patterns of violations.

In some embodiments, data repository 104 can be implemented with any non-volatile storage media known in the art. For example, data repository 104 may be implemented with a tape library, optical library, one or more independent hard disk drives, or multiple hard disk drives in a redundant array of independent disks (RAID). In an embodiment, data repository 104 can be implemented using any suitable storage architecture known in the art. For example, data repository 104 may be implemented with a relational database, an object-oriented database, or an object-relational database.

Figure 2:
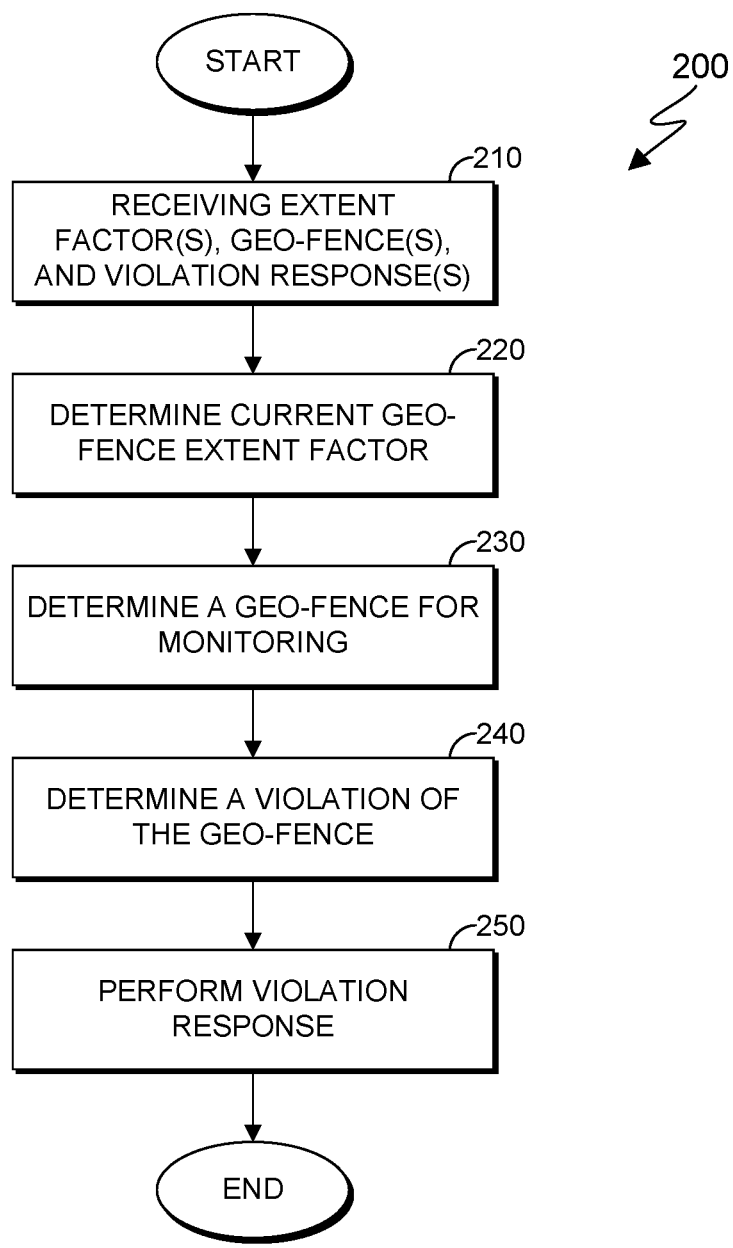
FIG. 2 is a flowchart depicting one example of a dynamic geo-fencing method in accordance with one or more embodiments disclosed herein.

FIG. 2 is a flowchart depicting one example of dynamic geo-fencing method 200, in accordance with one or more embodiments disclosed herein. As depicted, geo-fencing method 200 includes receiving (210) geo-fence extent factor information, determining (220) a current geo-fence extent factor, determining (230) a geo-fence for monitoring, determining (240) a violation of the geo-fence, and performing (250) a violation response. In some embodiments, method 200 is performed by geo-fence program 101. Method 200 may also be performed by any other computer program while working with geo-fence program 101.

Method 200 may be described with reference to FIGS. 3A and 3B. FIGS. 3A and 3B are plan view illustrations depicting examples of dynamic geo-fencing scenarios. FIG. 3A and FIG. 3B each depict a different example of a modification to a geo-fence. FIG. 3A includes activation area 302, user 304, user 306, resource 310, geo-fence extent 314, geo-fence extent 316, and geo-fence 320. Geo-fence extents 314, 316, and 320 represent geo-fence extents for a geo-fence that corresponds to resource 310. FIG. 3B includes resource 330, geo-fence extent 332, and geo-fence extent 334. Geo-fence extents 332 and 334 are geo-fence extents for a geo-fence that corresponds to resource 330.

Receiving (210) geo-fence information may include receiving a geo-fence, one or more geo-fence extent factors, a resource, and an activation area. Receiving a geo-fence may include receiving one or more extents, or boundaries, of the geo-fence. A geo-fence extent may be defined in terms of, for example, geographical position (e.g., coordinates), size (e.g., area, radius, volume, etc.), or shape (e.g., pie-shaped, circular, spherical, etc.).

The extent at which a geo-fence is activated may depend on the extent factor(s) associated with the user(s) detected in the activation area. For example, in FIG. 3A, geo-fence extent 314 may correspond to the extent factor of a user being a manufacturing intern, and geo-fence extent 316 may correspond to the extent factor of a user being a manufacturing manager. In some embodiments, geo-fence information may be received by a user of geo-fence program 101 and stored in data repository 104.

Receiving geo-fence information may include receiving one or more geo-fence extent factors. A user may be associated with one or more geo-fence extent factors, and each geo-fence extent factor corresponds to a particular extent of a geo-fence. For example, in FIG. 3A, it may be determined that user 304 is a manufacturing intern associated with the extent factor of being a manufacturing intern by, for example, analyzing a stored employee profile. It may be similarly determined that user 306 is associated with the extent factor of being a manufacturing manager.

Receiving geo-fence information may include receiving a resource for each geo-fence and a violation response for each resource. The violation response for a corresponding resource may be performed in response to the geo-fence being violated, that is, for example, determining that a user has encroached the geo-fence. A resource may be any device connected to geo-fence program 101 with which an action (e.g., a violation response) can be taken. Resources may include, for example, manufacturing machinery or construction equipment.

Receiving geo-fence information may include receiving an activation area. The boundary of the activation area may encompass one or more of the geo-fences. Extents of geo-fences and activation areas may be determined using a GPS, an indoor positioning system, or RFID. Devices utilizing, for example, RF (e.g., Bluetooth low energy devices or beacons), magnetic fields, acoustical signals, or optical signals may identify the geographic positions of a user (e.g., a tracking device of the user) within an activation area or determine that a geo-fence extent is violated.

Determining (220) a current geo-fence extent factor may include detecting a user within an activation area and determining the extent factors associated with the user. In some embodiments, determining a current geo-fence extent factor includes monitoring the activation area for a geo-fence extent factor in response to receiving the geo-fence extent factor, and the geo-fence extent factor is determined to be a current geo-fence extent factor responsive to detecting the geo-fence extent factor within the activation area.

As an example, an activation area may encompass a welding section of a factory, and a geo-fence extent factor may be a welding certification for a factory employee. The presence of the welding certification for an employee may be detected, for example, from an indication in a RF-readable employee badge carried by the employees. When a factory employee enters the activation area of the welding section, determined, for example, by detecting the RF-readable badge, it is determined whether or not the badge includes an indication of the welding certification. If the welding certification is detected, then the welding certification is considered a current geo-fence extent factor.

In some embodiments, an activation area is continuously monitored for received geo-fence extent factors. In alternative embodiments, such as when multiple activation areas exist, a particular activation area is monitored for a received geo-fence extent factor in response to determining that the geo-fence extent factor corresponds to a geo-fence within the particular activation area. In this manner, resources used for actively monitoring the activation areas may be conserved.

Continuing the factory example, the factory may additionally include a cutting section and a fabrication section, each with an encompassing activation area. The geo-fence extent factor of the cutting certification may correspond to a geo-fence for a circular saw machine located in the cutting section, wherein the circular saw is shut down when the geo-fence is violated. In response to determining that the geo-fence for the cutting certification geo-fence extent factor is located within the cutting section, the activation area encompassing the cutting section is then monitored for detection of the cutting certification (e.g., as an RF-readable indication in a badge of an entering factory employee). Activation areas for the fabrication section and the welding section, however, may not be similarly monitored in response.

Determining (230) a geo-fence extent to monitor may include determining the geo-fence that corresponds to the detected current geo-fence extent factor, determining the extent, or boundary, of the geo-fence, and activating the geo-fence to monitor the area encompassed by the extent. In instances where a detected current geo-fence extent factor corresponds to multiple geo-fences, an extent may be determined for each of the geo-fences.

In some embodiments, each geo-fence corresponds to a single geo-fence extent factor (e.g., presence of hard hat/helmet). In alternative embodiments, a geo-fence may correspond to multiple geo-fence extent factors (e.g., presence of hard hat/helmet and employee supervisory status), and each of the geo-fence extent factors may correspond to a distinct geo-fence extent. For example, geo-fence extents may differ in size (e.g., area, radius, volume, etc.) or shape (e.g., pie-shaped, circular, spherical, etc.). Determining a geo-fence extent to activate and monitor may include selecting an existing extent corresponding to the current geo-fence extent factor, or one of the multiple current geo-fence extent factors, or determining a new geo-fence extent.

In instances where only one of the multiple corresponding geo-fence extent factors has been detected as a current geo-fence extent factor, the extent corresponding to the detected current geo-fence extent factor may be activated. In instances where multiple geo-fence extent factors are simultaneously detected as current geo-fence extent factors, the extent to be activated for the geo-fence may be selected from those corresponding to the current geo-fence extent factors or a new geo-fence extent may be designed, based on a set of rules. In some embodiments, the set of rules, in general, operates to determine the extent that would provide maximum safety if a violation occurs. For example, a rule may determine the extent that would be violated by a current geo-fence extent factor, or any one of the current geo-fence extent factors, before the other extents of the geo-fence would be violated by the geo-fence extent factor.

In some embodiments, a rule for determining the extent of a geo-fence operates to determine the largest extent of those for the multiple current geo-fence extent factors. For a geo-fence that monitors geographical position, the largest extent may be the extent encompassing the largest area or volume. For example, in FIG. 1, where extent 114 and extent 116 both correspond to current geo-fence extent factors, the largest extent is extent 114 based on encompassed area.

In some embodiments, a rule for determining the extent of a geo-fence is to determine the smallest extent among the extents corresponding to multiple current geo-fence extent factors. For a geo-fence that monitors temperature, and that is violated when the temperature exceeds a threshold, the smallest extent may be the extent with the lowest temperature threshold.

In some embodiments, a rule for determining the extent of a geo-fence is to determine a combined extent that is based on two or more of the boundaries for the multiple current geo-fence extent factors. A combined extent may comprise a combination of the sizes or shapes of the extents for the current geo-fence extent factors. For example, in FIG. 1, where extent 114 and extent 116 both correspond to current geo-fence extent factors, extent 120 is determined to be the average extent based on the boundary shapes and areas of extent 114, which is a larger, circular extent, and extent 116, which is a smaller, rectangular extent.

Determining (240) that a geo-fence has been violated may include monitoring the geo-fence area for the corresponding current geo-fence extent factor and determining that the current geo-fence extent factor has traversed the extent of the corresponding geo-fence. In some embodiments, traversal of the geo-fence occurs based on location, i.e., the geographic position of the geo-fence extent factor in relation to the geographic position of the geo-fence.

For example, geo-fence may be comprised of a network of RF beacons that detect when a geo-fence extent factor crosses a virtual boundary, formed by the networked beacons, from a particular direction. As an illustration, a current geo-fence extent factor may be the non-presence of a welding certification on an employee badge, which is detected within an activation area. In response, and after determining the extent of the corresponding geo-fence, the geo-fence may be circular in shape and monitors, in response to the violation, whether it is positionally traversed from outside the boundary by an RF-readable employee badge containing an indication of the certification.

As another example, a geo-fence extent may be based on a proximity, or a maximum or minimum distance, between two or more objects. In such instances, one of the objects may be the current geo-fence extent factor and the geo-fence extent may be a defined distance between the current geo-fence extent factor and a second object. As an illustration, a geo-fence extent may be a defined distance between two volatile chemicals, as measured by, e.g., networked beacons located on their containers, and the geo-fence is violated if the distance becomes less than the defined minimum distance. As another illustration, the geo-fence extent may be a distance between a machine and a safety device, and the geo-fence is violated if the distance becomes greater than a defined maximum distance.

In some embodiments, traversal of an extent of the geo-fence occurs based on a threshold value being met. For example, the threshold extent may be a defined temperature, and the geo-fence is violated if the temperature, monitored in a particular defined area, becomes above or below the maximum or minimum threshold temperature.

In some embodiments, where multiple current geo-fence extent factors correspond to the same geo-fence, a violation of the geo-fence occurs if any of the current geo-fence extent factors traverse the geo-fence extent. For example, in FIG. 3A, user 304 and user 306 represent current geo-fence extent factors for extent 320, and a violation of the geo-fence occurs if either user 304 or user 306 traverses extent 320.

Each violation may be recorded and stored along with information related to the violation. Violation information may include the violated geo-fence, the design of the violated extent (e.g., the shape, size, and geographical position of the boundary), the location on the geo-fence where the violation occurred, the geo-fence extent factor that violated the geo-fence, the resource corresponding to the violated geo-fence, and the date and time of the violation. In some embodiments, violations may be predicted by determining a pattern based on the violation information. For example, it may be determined that a violation of a geo-fence corresponding to a machine frequently occurs on Tuesdays between 4 pm and 5 pm.

In response to determining a violation pattern for a geo-fence, the geo-fence extent may be modified. In some embodiments, the geo-fence extent may be modified in a manner that causes the geo-fence to detect violations earlier and therefore perform a violation response earlier, in order to increase safety. The extent may be modified with respect to the date/time of the violations in the violation pattern. For example, the extent of the geo-fence in the previous example may be enlarged proportionally (i.e., maintaining the shape of the original geo-fence) by fifty percent on Tuesdays between 4 pm and 5 pm. Further, the extent may be modified with respect to the location of the violations in the violation pattern. For example, in FIG. 3B, a pattern of violations at geo-fence extent 332 has occurred in a particular area of the geo-fence. To detect violations earlier, geo-fence extent 332 is modified into modified geo-fence extent 334 by extending the extent in that particular area to account for a prediction that violations will continue to occur there.

Performing (250) a violation response may include determining the violation response that corresponds to the violated geo-fence and performing the violation response for a resource. A violation response may include, for example, providing an audial or visual warning, shutting down the corresponding resource, or adjusting the atmospheric temperature (e.g., through air geo-fence extent factoring or heating).

In some embodiments, the violation response is maintained until it is determined that the violation is resolved. For example, a machine may be shut down in response to a geo-fence being traversed by an unauthorized employee (e.g., a non-manager), and the machine may remain shut down until the employee is no longer detected (e.g., through a worn RF-readable badge) within the encompassed geo-fence area.

Figure 4:
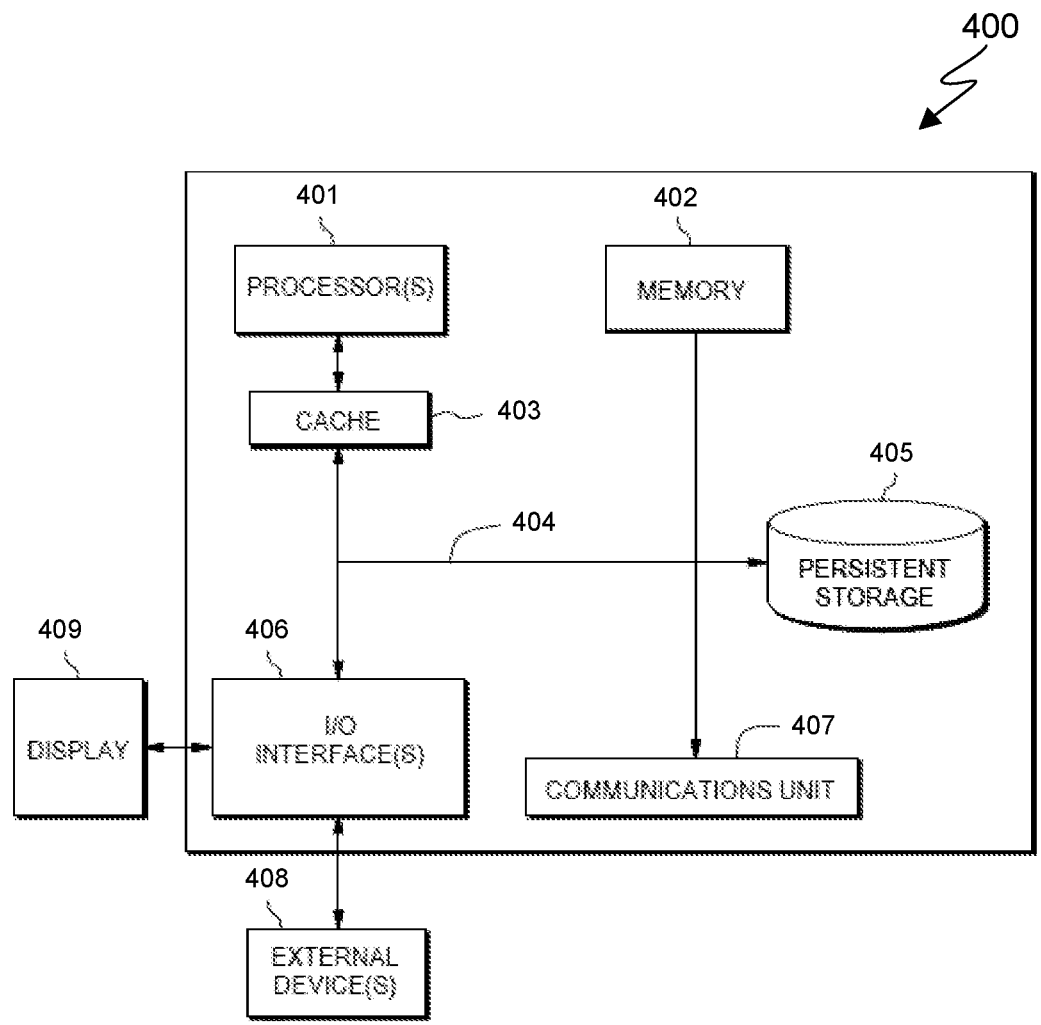
FIG. 4 is a block diagram depicting one example of a computing system suitable for executing the method of FIG. 2.

FIG. 4 depicts computing system 400, which illustrates components of geo-fence program 101. Computing system 400 includes processor(s) 401, cache 403, memory 402, persistent storage 405, communications unit 407, I/O interface(s) 406, and communications fabric 404.

Communications fabric 404 provides communications between cache 403, memory 402, persistent storage 405, communications unit 407, and I/O interface(s) 406. Communications fabric 404 can be implemented with any architecture designed for passing data and/or control information between processors (e.g., microprocessors, communications and network processors, etc.), system memory, peripheral devices, and any other hardware components within a system. For example, communications fabric 404 may be implemented with one or more buses or a crossbar switch.

Memory 402 and persistent storage 405 are computer readable storage media. In an embodiment, memory 402 includes random access memory (RAM) (not shown). In general, memory 402 may include any suitable volatile or non-volatile computer readable storage media. Cache 403 is a fast memory that enhances the performance of processors 401 by holding recently accessed data, and data near recently accessed data, from memory 402.

Program instructions and data used to practice embodiments of the present invention may be stored in persistent storage 405 and in memory 402 for execution by one or more of the respective processors 401 via cache 403. In an embodiment, persistent storage 405 includes a magnetic hard disk drive. Alternatively, or in addition to a magnetic hard disk drive, persistent storage 405 may include a solid state hard drive, a semiconductor storage device, read-only memory (ROM), erasable programmable read-only memory (EPROM), flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program instructions and data used to practice embodiments of the present invention may be downloaded to persistent storage 405 through communications unit 407.

I/O interface(s) 406 allows for input and output of data with other devices that may be connected to each computer system. For example, I/O interface 406 may provide a connection to external devices 408 such as a keyboard, keypad, a touch screen, and/or some other suitable input device. External devices 408 can also include portable computer readable storage media such as, for example, thumb drives, portable optical or magnetic disks, and memory cards. Software and data used to practice embodiments of the present invention can be stored on such portable computer readable storage media and can be loaded onto persistent storage 405 through I/O interface(s) 406. I/O interface(s) 406 also connect to display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational blocks to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

Embodiments of the present invention may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

What is claimed is:

1. A method comprising:
   detecting a user located within an activation area that includes one or more geo-fences, wherein a boundary of a geo-fence of the one or more geo-fences is defined by one or more geo-fence extents;
   determining a first geo-fence extent factor of one or more geo-fence extent factors, associated with an attribute of the user and corresponding respectively to the one or more extents of a geo-fence of the one or more geo-fences within the activation area;
   selecting a first extent for a first geo-fence that corresponds to the first geo-fence extent factor associated with the user; and
   responsive to determining that the first extent of the first geo-fence within the activation area is violated by the location of the user, performing a violation response corresponding to the first geo-fence extent factor.

2. The method of claim 1, further comprising:
   tracking a geographic position of the user that is proximate to the first geo-fence within the activation area.

3. The method of claim 1, further comprising:
   predicting a future violation of the first geo-fence based on a pattern of violations of the first geo-fence; and
   modifying the first geo-fence based on the predicted future violation.

4. The method of claim 1, further comprising:
   determining a second geo-fence extent factor associated with a second user; and
   determining a second extent for the first geo-fence based on the second geo-fence extent factor corresponding to the second extent and associated with the second user.

5. The method of claim 4, wherein a new extent is an average of the first extent and the second extent.

6. The method of claim 1, wherein an attribute of the user associated with the first geo-fence extent factor includes one or more wearable items of the user.

7. The method of claim 1, wherein an attribute of the user associated with the first geo-fence extent factor includes a role of the user.

8. The method of claim 1, wherein an attribute of the user associated with the first geo-fence extent factor includes a condition of an environment within the first geo-fence.

9. The method of claim 1, wherein an attribute of the user associated with the first geo-fence extent factor includes an authorization level of the user.

10. The method of claim 1, where the violation response is selected from the group consisting of communicating a warning to the user violating the geo-fence, and shutting down equipment located within the geo-fence.

11. A computer program product comprising:
    one or more computer readable storage media; and
    program instructions stored on the one or more computer readable storage media, the program instructions comprising:
      program instructions to detect a user located within an activation area that includes one or more geo-fences, wherein a boundary of a geo-fence of the one or more geo-fences is defined by one or more geo-fence extents;
      program instructions to determine a first geo-fence extent factor of one or more geo-fence extent factors associated with an attribute of the user, and corresponding respectively to the one or more extents of a geo-fence of the one or more geo-fences within the activation area;
      program instructions to select a first extent for a first geo-fence that corresponds to the first geo-fence extent factor associated with the user; and
      responsive to determining that the first extent of the first geo-fence within the activation area is violated by the location of the user, program instructions to perform a violation response corresponding to the first geo-fence extent factor.

12. The computer program product of claim 11, further comprising:
program instructions to track a geographic position of the user that is proximate to the first geo-fence within the activation area.

13. The computer program product of claim 11, further comprising:
program instructions to predict a future violation of the first geo-fence based on a pattern of violations of the first geo-fence; and
program instructions to modify the first geo-fence based on the predicted future violation.

14. The computer program product of claim 11, further comprising:
program instructions to determine a second geo-fence extent factor associated with a second user; and
program instructions to determine a second extent for the first geo-fence based on the second geo-fence extent factor corresponding to the second extent and associated with the second user.

15. A computer system comprising:
one or more computer processors;
one or more computer readable storage media;
program instructions stored on the one or more computer readable storage media, the program instructions comprising:
program instructions to detect a user located within an activation area that includes one or more geo-fences, wherein a boundary of a geo-fence of the one or more geo-fences is defined by one or more geo-fence extents;
program instructions to determine a first geo-fence extent factor of one or more geo-fence extent factors associated with an attribute of the user, and corresponding respectively to the one or more extents of a geo-fence of the one or more geo-fences within the activation area;
program instructions to select a first extent for a first geo-fence that corresponds to the first geo-fence extent factor associated with the user; and
responsive to determining that the first extent of the first geo-fence within the activation area is violated by the location of the user, program instructions to perform a violation response corresponding to the first geo-fence extent factor.

16. The computer system of claim 15, wherein an attribute of the user associated with the first geo-fence extent factor includes one or more wearable items of the user.

17. The computer system of claim 15, wherein an attribute of the user associated with the first geo-fence extent factor includes a role of the user.

18. The computer system of claim 15, wherein an attribute of the user associated with the first geo-fence extent factor includes a condition of an environment within the first geo-fence.

19. The computer system of claim 15, wherein an attribute of the user associated with the first geo-fence extent factor includes an authorization level of the user.

20. The computer system of claim 15, where the violation response is selected from the group consisting of communicating a warning to the user violating the geo-fence, and shutting down equipment located within the geo-fence.

* * * * *